United States Patent
Wang et al.

(10) Patent No.: US 10,452,865 B2
(45) Date of Patent: *Oct. 22, 2019

(54) METHOD AND SYSTEMS USING PRIVACY-PRESERVING ANALYTICS FOR AGGREGATE DATA

(71) Applicant: Mitsubishi Electric Research Laboratories, Inc., Cambridge, MA (US)

(72) Inventors: Ye Wang, Andover, MA (US); Nisarg Jagdishbhai Raval, Durham, NC (US); Prakash Ishwar, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 297 days.

This patent is subject to a terminal disclaimer.

(21) Appl. No.: 15/394,929

(22) Filed: Dec. 30, 2016

(65) Prior Publication Data

US 2018/0189515 A1  Jul. 5, 2018

(51) Int. Cl.
*G06F 21/62* (2013.01)

(52) U.S. Cl.
CPC .. *G06F 21/6254* (2013.01); *G06F 2221/2115* (2013.01)

(58) Field of Classification Search
CPC ............. G06F 21/6245; G06F 21/6254; G06F 2221/2115

See application file for complete search history.

(56) References Cited

U.S. PATENT DOCUMENTS

| | | | |
|---|---|---|---|
| 9,946,895 B1* | 4/2018 | Kruse | G06F 21/6245 |
| 9,996,061 B2* | 6/2018 | Shu | G05B 15/02 |
| 2010/0146583 A1* | 6/2010 | Prehofer | G06Q 10/10 |
| | | | 726/1 |

(Continued)

OTHER PUBLICATIONS

Hattori et al. "Privacy-Utility Tradeoff for the Appliance Usage Analysis of Smart-Meter Data." Computer Security Symposium 2016 Proceedings, pp. 1215-1222, Oct. 4, 2016.

(Continued)

*Primary Examiner* — Harunur Rashid
(74) *Attorney, Agent, or Firm* — Gennadiy Vinokur; James McAleenan; Hironori Tsukamoto (57) ABSTRACT

Systems and methods for protecting a privacy of aggregated data from third parties, while preserving analytical usefulness of the aggregated data. A processor performs an offline training stage by, acquiring stored statistical contribution of sensitive devices that corresponds to the aggregated data, as a function of a state of a sensitive device at each time point within a period of time. Performing a real-time stage by determining a state of the sensitive device contributing to the aggregated data at each time point within the period of time. Selecting, from memory, based on the determined state of the sensitive device at each time point, a corresponding statistical contribution of the sensitive device to the aggregated data at each time point. Subtracting the statistical contribution selected for a time point from a value of the aggregated data at the corresponding time point, to produce modified aggregated data, and transmitting to third parties.

19 Claims, 6 Drawing Sheets

(56) References Cited

U.S. PATENT DOCUMENTS

2012/0322458 A1* 12/2012 Shklarski .............. H04W 12/02
455/456.1
2015/0332292 A1* 11/2015 Unser .................... G06Q 30/02
705/7.31
2017/0316214 A1* 11/2017 El Defrawy ............ G06F 21/60

OTHER PUBLICATIONS

Kim, Hyungsul, et al. "Unsupervised disaggregation of low frequency power measurements." Proceedings of the 2011 SIAM International Conference on Data Mining. Society for Industrial and Applied Mathematics, 2011.

Erdogdu et al. "Privacy-utility trade-off for time-series with application to smart-meter data", in Proc. of the AAAI Conference on Artificial Intelligence, Workshop on Computational Sustainability, AAAI 2015 Workshop, Jan. 26, 2015, Austin, TX, USA.

Erdogdu et al. "Privacy-Utility Trade-off under Continual Observation", in Proc. of the IEEE International Symposium on Information Theory, ISIT 2015, Jun. 14-19, 2015, Hong Kong.

Ghahramani et al. "Factorial Hidden Markov Models", Machine Learning, 29, 245-273 (1997) °c 1997 Kluwer Academic Publishers. Manufactured in The Netherlands.

Kolter et al. "REDD: A Public Data Set for Energy Disaggregation Research", in Proceedings of the SustKDD workshop on Data Mining Applications in Sustainability 2011.

Sankar et al. "Smart Meter Privacy: A Theoretical Framework", IEEE Transactions on Smart Grid 4(2):837-846 • Jun. 2013.

Rajagopalan et al. "Smart Meter Privacy: A Utility-Privacy Framework", Smart Grid Communications (SmartGridComm), 2011 IEEE International Conference on Oct. 17-20, 2011.

Zeifman et al. "Nonintrusive Appliance Load Monitoring: Review and Outlook", IEEE Transactions on Consumer Electronics, vol. 57, No. 1, Feb. 2011.

* cited by examiner

METHOD AND SYSTEMS USING PRIVACY-PRESERVING ANALYTICS FOR AGGREGATE DATA

FIELD

The present disclosure relates to methods and systems for removing portions of user sensitive information from an aggregate data stream, and more particularly to privacy protection of the user aggregated data before transmitting to a third party, while preserving the analytical usefulness of the aggregated data.

BACKGROUND

For many consumers, the collection of user data raises privacy concerns because such data is particularly associated with information that a user may deem sensitive and wants to keep private. The problem for consumers is that consumer service providers have access to their private information including personal behavior and lifestyle (such as, appliance use, eating and sleeping patterns, occupancy patterns, household activity patterns), health status, household make-up, mobility patterns and the like. The collection of data by the consumer service provider can happen without the user consent or potentially without a possibility for the user to opt-out. The consumer service provider collecting the user's data is likely to make this data available to third parties, either without the user's knowledge and/or without the user knowing the extent of the collected data in terms of their personal privacy. Typically, consumers trust their consumer service provider collecting the data, but do not trust the third-party with whom the consumer service provider may share the consumer's collected data.

Specifically, this problem of protecting consumer/user privacy data goes to the control over service providers and third-party's access to their use personal data. In particular, releasing personal information which is considered private to the consumer.

Some conventional solutions for protecting consumer's personal data, include modifying the consumer's privacy data prior to releasing the consumer's data to third party. Such methods are usually referred as data anonymization methods aiming for protecting the consumer's privacy data while preserving an analytical usefulness of the data.

For example, some methods use non-intrusive appliance load monitoring to modify the aggregate energy data such that privacy of the energy data is protected, while analytical usefulness of the energy data is preserved. However, such methods require the actual states of the power consuming devices consuming the energy. Specifically, such methods require the actual state of a device, i.e., whether the device is turned ON or turned OFF, at a specific point of time when the energy data is collected. These conventional methods requiring the actual state of the device presents many problems because sensors are needed to be connected to each consuming device that consumes energy for each client, which is economically infeasible or even prohibitive in view of the privacy constraints.

Accordingly, there is a need for a data anonymization method that can minimize or avoid the usage of the actual state of the device producing the data.

SUMMARY

According to embodiments of the present disclosure to provide systems and methods for transmitting aggregated data to a third party, such that a privacy of the aggregated data is protected, while analytical usefulness of the aggregated data is preserved.

Embodiments of the present disclosure provide for preserving privacy of an aggregate data stream, which is a time-series signal that is a sum of several component data streams. The aggregate data stream relates to and is collected from a user/client, and privacy concerns arise since the aggregate data is typically released to one or more service providers for analytics. The aggregate data includes usage of a power consumer by a user, wherein the power consumer includes a structure, a part of a structure, an electronic device, a power consuming device or some combination thereof. Further, the user energy data can be collected using a metering device located on a consumer side of the metering device.

Further, consider an aggregate energy consumption data stream collected from a household, wherein the occupants of the household may be concerned of revealing sensitive lifestyle and behavioral details, from the energy consumption patterns of their appliances. Another example may include data collected from a factory, the operator/owner may be concerned of leaking process details or other trade secrets, among other things, that may be related to the energy consumption patterns of their machines/processes. The collection of the user's/client's data for analysis by one or more service providers may also be desirable, if useful analytics could be performed for the benefit of the user/client and/or provider(s).

To address protecting privacy of the aggregated data, while preserving the analytical usefulness of the aggregated data some embodiments of the present disclosure the steps of receiving aggregated data generated from multiple sensors that includes time-series data collected over a period of time of sensitive devices and non-sensitive devices, wherein each sensor senses data at a set of time points within the period of time. Perform an offline training stage via a processor by acquiring stored historical device data and historical statistical contribution data from data generated from devices including sensitive devices of a same device type as the sensitive devices that generated the aggregated data. Wherein the stored historical statistical contribution for each sensitive device corresponds to the aggregated data as a function of a state of the sensitive device at each time point within the period of time. Performing a real-time stage by determining a state of the sensitive device contributing to the aggregated data at each time point within the period of time. Selecting, from the memory, based on the determined state of the sensitive device at each time point, a corresponding stored historical statistical contribution of the sensitive device to the aggregated data at each time point. Subtracting the stored historical statistical contribution selected for a time point from a value of the aggregated data at the corresponding time point, to produce modified aggregated data. Finally, transmitting using a transmitter the modified aggregated data to a third party over a communication channel.

We realized through the development of the concept that instead of hiding or distorting sensitive information, we should remove sensitive information from the aggregated data. During this development we learned certain information is unknown, for example, the first we did not know an amount of contribution of sensitive information to the aggregated data, and second, we did not know what the function of the contribution is to the aggregated data.

In addressing how to overcome not having these two unknowns, we discovered that in some applications, the function of contribution as an additive combination, via energy usage of sensitive appliances and other appliances, can be combined in a total energy usage signal, i.e. aggregate data. For those applications, we figured out or realized that a Gaussian Factorial Hidden Markov Model (FHMM) can be applied to model the data, for example, the usage data of the sensitive appliances. As a result, the data, i.e. aggregate data, can be analyzed statistically, so we can use statistics to find an answer on the first unknown question of determining an amount of contribution of the sensitive data, because the mean and the variance of devices in different states are known.

Regarding the second unknown, we realized we can statistically suppress the sensitive component by equalizing the mean and variance across underlying states of the sensors. Wherein, we were able to estimate the underlying states of the sensitive component of the aggregate data, via a Viterbi algorithm. Further, we were able to implement an equalize means by subtracting out the means of the estimated state from the aggregate data. Finally, we discovered that the equalize variance can be addressed by adding Gaussian white noise with variance equal to the difference between the maximal variance and the variance of the estimated state.

Thus, we are able to solve the problem of preserving privacy of an aggregate data stream, along with overcoming not knowing the two unknowns. In particular, we can address situations where the individual components, i.e. sensitive component, that make up the sum of the aggregate data can be reasonably statistically modeled as independent Gaussian processes with means and variances determined by some underlying states. Specifically, the methods and systems of the present disclosure suppress the detectability of the underlying states of the sensitive component of the aggregate data stream.

Some benefits of the present disclosure can include reducing the detectability of the sensitive component's underlying states, such we the present disclosure applies a privacy-mechanism to equalize the means and variances across of underlying states of the sensitive component. Another benefit is that a tradeoff parameter can be used as input to this privacy-preserving mechanism to select the level of variance equalization in order to tradeoff between better privacy versus lower distortion, among many benefits. Still another aspect of the present disclosure is that the output of the privacy-preserving mechanism can be a modified aggregate data stream with reduced detectability of the sensitive component's underlying states. Further, the present disclosure uses the input to the privacy-preserving mechanism as the aggregate data, and the sequence of the underlying states of the sensitive component.

Another aspect of the present disclosure, may include a variant that the input does not need to include the sequence of the underlying states of the sensitive component, and hence only consists of the aggregate data stream. In this case, sequence of the underlying states of the sensitive component is first estimated from the aggregate data. Yet, in another variant of the present disclosure, multiple sensitive components can be considered and addressed by applying the above procedure several times, possibly in parallel, to reduce the detectability of each sensitive component.

The present disclosure can be implemented, by non-limiting example, beginning with the step of receiving aggregated data generated from multiple sensors. The aggregated data includes time-series data collected over a period of time of sensitive devices and non-sensitive devices, wherein each sensor senses data at a set of time points within the period of time. Followed by the step of performing an offline training stage via a processor. The offline training stage includes acquiring stored historical device data and historical statistical contribution data from data generated from devices including sensitive devices of a same device type as the sensitive devices that generated the aggregated data. Specifically, the stored historical statistical contribution for each sensitive device corresponds to the aggregated data as a function of a state of the sensitive device at each time point within the period of time.

The next step includes performing a real-time stage. The real-time stage includes determining a state of the sensitive device contributing to the aggregated data at each time point within the period of time. Followed by selecting, from the memory, based on the determined state of the sensitive device at each time point, a corresponding stored historical statistical contribution of the sensitive device to the aggregated data at each time point. Then, subtracting the stored historical statistical contribution selected for a time point from a value of the aggregated data at the corresponding time point, to produce modified aggregated data.

Finally, the step of transmitting the modified aggregated data to a third party over a communication channel using a transmitter.

According to an embodiment of the present disclosure, a system for transmitting aggregated data to a third party, such that a privacy of the aggregated data is protected, while analytical usefulness of the aggregated data is preserved. The system including a transceiver receiving aggregated data generated from multiple sensors that includes time-series data collected over a period of time of sensitive devices and non-sensitive devices, wherein each sensor senses data at a set of time points within the period of time. A processor in communication with the transceiver. A memory coupled to the processor and storing program instructions executable by the processor to implement. Wherein the processor is configured to perform an offline training stage. The offline training stage includes acquiring stored historical statistical contribution data from data generated from sensitive devices of a same device type as the sensitive devices that generated the aggregated data. Wherein the stored historical statistical contribution for each sensitive device corresponds to the aggregated data as a function of a state of the sensitive device at each time point within the period of time. Performing a real-time stage. The real-time stage includes determining a state of the sensitive device contributing to the aggregated data at each time point within the period of time. Selecting, from the memory, based on the determined state of the sensitive device at each time point, a corresponding stored historical statistical contribution of the sensitive device to the aggregated data at each time point. Further, subtracting the stored historical statistical contribution selected for a time point from a value of the aggregated data at the corresponding time point, to produce modified aggregated data. Finally, a transmitter is can be used for transmitting the modified aggregated data to the third party over a communication channel.

According to another embodiment of the present disclosure, a method for transmitting aggregated data to a third party, such that a privacy of the aggregated data is protected, while analytical usefulness of the aggregated data is preserved. The method including receiving, using a transceiver, aggregated data generated from multiple sensors that includes time-series data collected over a period of time of sensitive devices and non-sensitive devices, wherein each sensor senses data at a set of time points within the period of time. Using a processor in communication with the transceiver and a memory, and storing program instructions executable by the processor to implement. Performing an offline training stage, that includes acquiring stored historical device data and historical data statistical contribution data from data generated from devices including sensitive devices of a same device type as the sensitive devices that generated the aggregated data, wherein the stored historical statistical contribution for each sensitive device corresponds to the aggregated data as a function of a state of the sensitive device at each time point within the period of time. Performing a real-time stage which includes determining a state of the sensitive device contributing to the aggregated data at each time point within the period of time. Selecting, from the memory, based on the determined state of the sensitive device at each time point, a corresponding stored historical statistical contribution of the sensitive device to the aggregated data at each time point. Then, subtracting the stored historical statistical contribution selected for a time point from a value of the aggregated data at the corresponding time point, to produce modified aggregated data. Finally, transmitting using a transmitter the modified aggregated data to a third party over a communication channel.

According to another embodiment of the present disclosure, a non-transitory computer readable storage medium embodied thereon a program executable by a computer for performing a method. The method for transmitting aggregated data to a third party, such that a privacy of the aggregated data is protected, while analytical usefulness of the aggregated data is preserved. The method includes obtaining, aggregated data generated from multiple sensors that includes time-series data collected over a period of time of sensitive devices and non-sensitive devices, wherein each sensor senses data at a set of time points within the period of time. Using a processor for performing an offline training stage. The offline training stage includes acquiring stored historical statistical contribution data from data generated from sensitive devices of a same device type as the sensitive devices that generated the aggregated data. Wherein the stored historical statistical contribution for each sensitive device corresponds to the aggregated data as a function of a state of the sensitive device at each time point within the period of time. Using the processor for performing a real-time stage. The real-time stage includes determining a state of the sensitive device contributing to the aggregated data at each time point within the period of time. Selecting, from the non-transitory computer readable storage medium, based on the determined state of the sensitive device at each time point, a corresponding stored historical statistical contribution of the sensitive device to the aggregated data at each time point. Subtracting the stored historical statistical contribution selected for a time point from a value of the aggregated data at the corresponding time point, to produce modified aggregated data. Finally, transmitting using a transmitter the modified aggregated data to a third party over a communication channel.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Definition of Terms

According to the definition of terms with regard to the present disclosure, the term analytical usefulness may be understood as the process of evaluating data using analytical and logical reasoning to examine each component of the data provided. This form of analysis can be just one of the many steps that may be completed when conducting a research analysis of data. Data from various sources can be gathered, reviewed, and then analyzed to form some sort of finding or conclusion. For example, regarding collected energy data from a client may include analytics for a benefit of the client and/or provider(s). A specific analytics objective of interest can be to determine the usage patterns of specific energy consuming device(s) (e.g., appliance(s) within a household), which may provide beneficial information to the client and/or provider, such as possibly aiding other services received by the client and/or performed by the provider (e.g., appliance operation information aiding a preventative maintenance/monitoring service, or providing marketing information). However, it may also be desirable to release an accurate representation of the energy consumption data to the provider(s) in order to enable later general analytics tasks not determined beforehand.

Overview

Figure 1A:
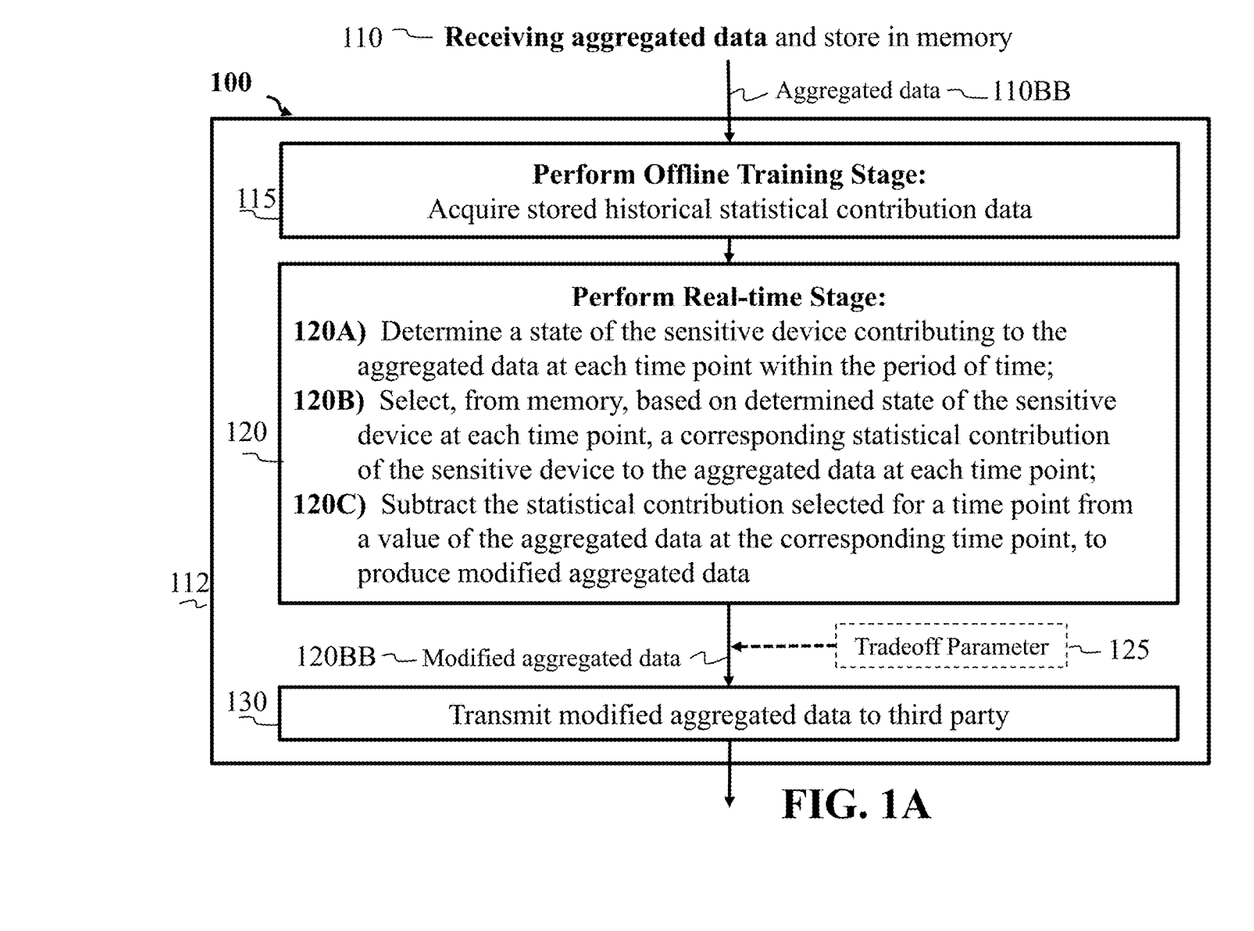
FIG. 1A is a block diagram of a method for transmitting aggregated data to a third party, such that a privacy of the aggregated data is protected, according to embodiments of the present disclosure.

FIG. 1A is a block diagram of a method for transmitting aggregated data to a third party, such that a privacy of the aggregated data is protected, according to embodiments of the present disclosure. The systems and methods of the present disclosure can include step 110 receiving aggregated data generated from multiple sensors via a computer 112 having a processor and a memory. The aggregated data 110BB includes time-series data collected over a period of time from sensitive devices and non-sensitive devices, such that each sensor senses data at a set of time points within the period of time. Contemplated is that the aggregate data may be received wireless or wired to a device in communication with the transceiver and stored in a computer readable memory. The aggregated data may also be collected via the processor via real time data up to a delay of a segment length in time. It is possible the aggregate data can be collected via sensing apparatus connected to the processor. For example, for a household energy monitoring application, this may be a smart meter that records the total household energy usage over time or some other type of measuring device.

Step 115 includes an offline training stage performed by acquiring stored historical device data and historical statistical contribution data from data generated from devices including sensitive devices of a same device type as the sensitive devices that generated the aggregated data 110BB. The stored historical statistical contribution for each sensitive device corresponds to the aggregated data 110BB as a function of a state of the sensitive device at each time point within the period of time.

Followed by, step 120 performing a real-time stage by sub-step 120A determining a state of the sensitive device contributing to the aggregated data at each time point within the period of time. Wherein a statistical model is employed to describe the statistical relationship between the device states and the aggregate energy data. The aggregate data may be pre-processed depending upon the particular application.

Sub-step 120B selecting, from memory, based on the determined state of the sensitive device at each time point, a corresponding stored historical statistical contribution of the sensitive device to the aggregated data at each time point. Then, sub-step 120C subtracting the stored historical statistical contribution selected for a time point from a value of the aggregated data at the corresponding time point, to produce modified aggregated data 120BB. Optionally, step 125 may include a tradeoff parameter used as input to the real-time stage 120, i.e., privacy-preserving mechanism, to select the level of variance equalization in order to tradeoff between better privacy versus lower distortion, among other benefits.

Finally, step 130 transmitting using a transmitter the modified aggregated data to a third party over a communication channel.

To better understand the embodiments of the present disclosure, we first need to appreciate the significance of what is an aggregate data stream. Aggregate data is a time-series signal that is a sum of several component data streams and is collected from a user/client, and privacy concerns arise since the aggregate data is typically released to one or more service providers for analytics, i.e. third parties. For example, consider an aggregate energy consumption data stream, which is the sum of the energy consumption across several energy consuming devices. If the energy consumption data is collected from a household, by non-limiting example, the occupants of the household may be concerned of revealing sensitive lifestyle and behavioral details, among other things, from the energy consumption patterns of their appliances. Another example may include data collected from a factory, the operator/owner may be concerned of leaking manufacturing process details or potential trade secrets, among other things, that may be related to the energy consumption patterns of their machines/processes in the factory. However, the collection of the user's/client's data for analysis by one or more service providers may be desirable, wherein useful analytics could be performed for the benefit of the user/client, and of course the third party provider(s).

The significance of the aggregate data stream, can for example, include an analytics objective. The analytics objective may be for energy consumption data that would be to determine the usage patterns of specific energy consuming device(s) (e.g., appliance(s) within a household or machines within a factory). The usage patterns may provide beneficial information to the client and/or provider, such as possibly aiding other services received by the client and/or performed by the provider (e.g., device operation information aiding a preventative maintenance/monitoring service or to provide marketing information). Further, the usage patterns of the energy consuming device(s) may also be desirable to release an accurate representation of the energy consumption data to the provider(s) in order to enable later general analytics not yet determined beforehand. For example, types of providers may include consumer service providers such as residential/entities, energy/power providers and phone/communication providers. Other types of consumer service providers may include health related providers, i.e. health-monitoring devices, or a type of monitoring service provider that provides sensors in houses, offices, cars, handheld devices or the like. Users or clients of consumer service providers may be one or combination of individuals and entities.

In addition to analytics objectives, we need to address privacy concerns by limiting the sensitive information revealed by the data released to the provider(s). When there are multiple providers involved, different levels of privacy with respect to each provider may be desired by the client. Formally characterizing these privacy concerns, quantifying how much information is revealed, or even determining what is considered sensitive information can be challenging tasks that require an understanding of the unique individual privacy concerns of the client within the context of the specific application. However, the embodiments of the present disclosure specifically address privacy as the concealment of the sensitive information of the client which may be correlated to one or more specific component data streams. For example, the usage of certain appliance(s) within a household that correlate highly with sensitive behavior by the occupants, or the operation of certain machine(s) within a factory that correlated highly with sensitive manufacturing processes. The overall problem can be posed as: how should the aggregate data stream be handled, processed, and analyzed by the client and provider(s), such that the useful analytics, i.e., recovering the usage patterns of some specific device(s) can be performed by the provider(s), while concealing the sensitive information, i.e., the usage pattern of some other sensitive device(s)) from the provider(s).

The present disclosure is based on a recognition that instead of hiding or distorting sensitive information, we should remove the sensitive information from the aggregated data. However, we discovered through experimentation implementing this realization would turn out to be more difficult than known methods that distorted the sensitive information. We learned certain information is unknown, for example, first, we did not know the amount of contribution of sensitive information to the aggregated data, and second, we did not know what the function of the contribution is to the aggregated data.

In overcoming the above noted unknown information, we learned that in some applications, the function of contribution as an additive combination, via energy usage of sensitive appliances and other appliances are combined in a total energy usage signal, i.e. aggregate data. For those applications, we realized that a Gaussian Factorial Hidden Markov Model (FHMM) can be applied to model the data, for example, the usage data of the sensitive appliances. As a result, the data, i.e. aggregate data, can be analyzed statistically, and thus we can use statistics to find an answer on the first question of determining an amount of contribution of the sensitive data, because the mean and the variance of devices in different states are known.

We further realized we can statistically suppress the sensitive component by equalizing the mean and variance across underlying states of the sensors. Thus, based on the above combination of realizations we were able to estimate the underlying states of the sensitive component of the aggregate data, via a Viterbi algorithm, by non-limiting example. Further, we were able to implement an equalize means by subtracting out the means of the estimated state from the aggregate data. Thus, the systems and methods of the present disclosure do not have to do high sampling frequencies to measure fine termporal features in the energy signal of the aggregated data. Nor, do they need the input of the true states of the appliances considered sensitive by the privacy concerns. Finally, we discovered that the equalize variance can be addressed by adding Gaussian white noise with variance equal to the difference between the maximal variance and the variance of the estimated state.

Based on the above realizations and experimentations, we can solve the problem of preserving privacy of an aggregate data stream. In particular, we can address situations where the individual components, i.e. sensitive component, that make up the sum of the aggregate data can be reasonably statistically modeled as independent Gaussian processes with means and variances determined by some underlying states. Specifically, the methods and systems of the present disclosure suppress the detectability of the underlying states of the sensitive component of the aggregate data stream. In other words, the systems and methods of the present disclosure do not need or require at each time step, the energy data and sensitive appliance state for both the current time step and the previous time step.

Some benefits of the present disclosure can include reducing the detectability of the sensitive component's underlying states, such we the present disclosure applies a privacy-mechanism to equalize the means and variances across of underlying states of the sensitive component. Another benefit is that a tradeoff parameter can be used as input to this privacy-preserving mechanism to select the level of variance equalization in order to tradeoff between better privacy versus lower distortion, among many benefits. Still another aspect of the present disclosure is that the output of the privacy-preserving mechanism can be a modified aggregate data stream with reduced detectability of the sensitive component's underlying states. Further, the present disclosure uses the input to the privacy-preserving mechanism as the aggregate data, and the sequence of the underlying states of the sensitive component.

Figure 1B:
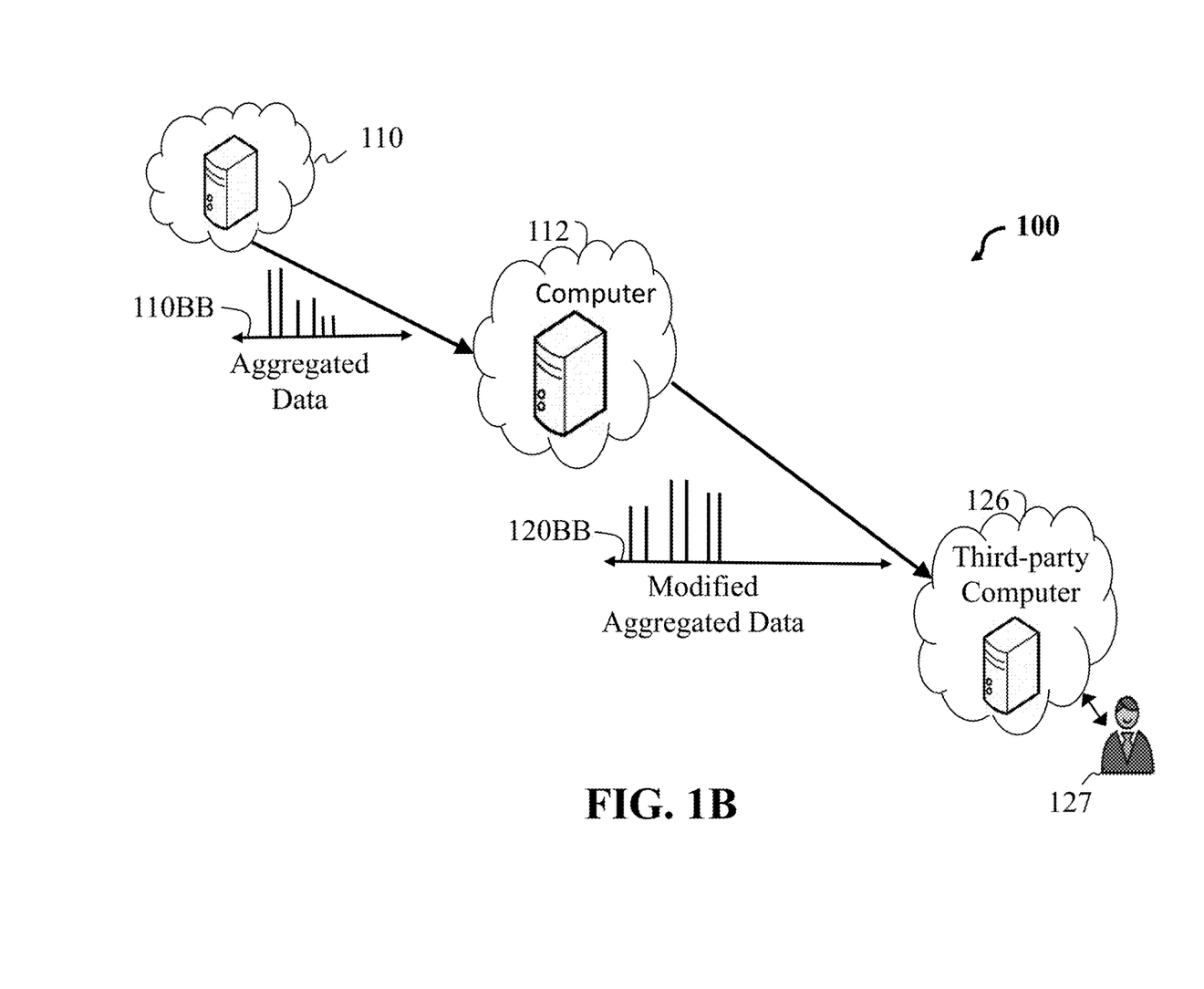
FIG. 1B is a schematic diagram of the method of FIG. 1A, for transmitting aggregated data to a third party that includes components of the method, such that a privacy of the aggregated data is protected, according to embodiments of the present disclosure.

FIG. 1B is a schematic illustrating method 100 of FIG. 1A, for transmitting aggregated data to a third party, such that a privacy of the aggregated data is protected, according to embodiments of the present disclosure. FIG. 1B shows a computer system 112 that can include a processor, memory and a transceiver, among other components. The transceiver of the computer 112 receives the aggregated data 110BB from a source computer 110 and stores the aggregated data 110BB in the memory of the computer system 112. Wherein the computer system 112 transforms the aggregated data 110BB into a modified aggregated data 120BB, and sends the modified aggregated data 120BB to a third party computer 126 of a third party 127.

Figure 1C:
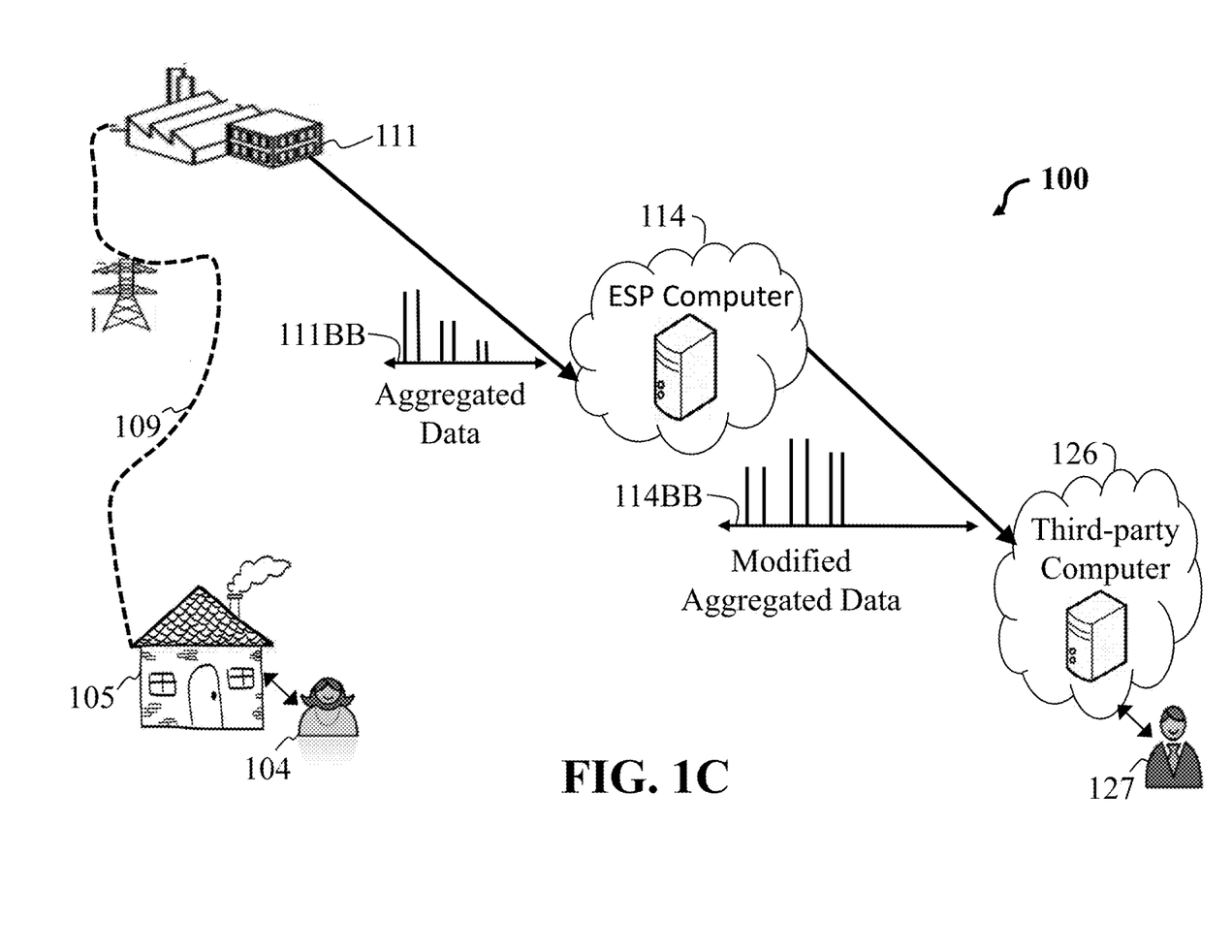
FIG. 1C is a schematic diagram of the method of FIG. 1A illustrating an alternate application or implementation of the method of FIG. 1A, according to embodiments of the present disclosure.

FIG. 1C is a schematic diagram of the method of FIG. 1A illustrating an alternate application or implementation of the method of FIG. 1A, according to embodiments of the present disclosure. FIG. 1C shows the source 111 that may be an Energy Service Provider (ESP) providing energy 109 to a client 104 having at least one power consumer 105, such as a house. The ESP 111 collects the client's 104 energy use from the client's house 105 over a period of time and formulates the client's aggregate data 111BB which is stored on the ESP computer 114. Wherein the ESP computer 114 transforms the aggregated data 111BB into a modified aggregated data 114BB, and sends the modified aggregated data 114BB to a third party computer 126 of a third party 127.

Figure 2:
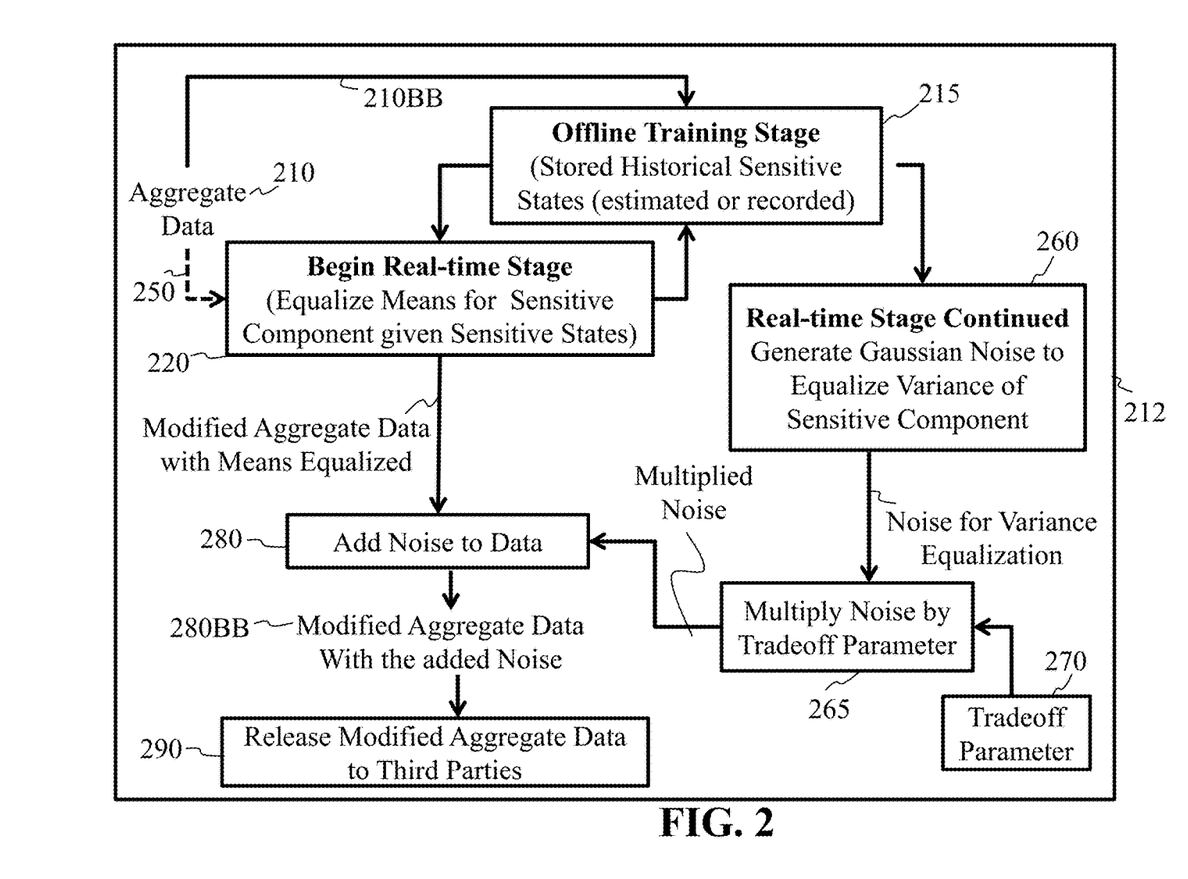
FIG. 2 is a block diagram of another method illustrating Gaussian Factorial Hidden Markov Model FHMM assumptions, wherein noise is added to the modified aggregate data so as to distort the aggregate data stream, according to embodiments of the present disclosure.

FIG. 2 is a block diagram of another method illustrating Gaussian Factorial Hidden Markov Model FHMM assumptions, wherein noise is added to the modified aggregate data to distort the aggregate data stream, according to embodiments of the present disclosure.

Step 210 is receiving aggregated data generated from multiple sensors via a computer 212 having a processor and a memory. The aggregated data 210BB includes time-series data collected over a period of time from sensitive devices and non-sensitive devices, such that each sensor senses data at a set of time points within the period of time.

The aggregated data 210BB is received by an offline training stage step 215. The offline training stage 215 is performed by acquiring stored historical device data and historical statistical contribution data from data generated from devices including sensitive devices of a same device type as the sensitive devices that generated the aggregated data 110BB. The stored historical statistical contribution for each sensitive device corresponds to the aggregated data 210BB as a function of a state of the sensitive device at each time point within the period of time.

Step 220 performs a real-time stage, which includes sub-step 120A determining a state of the sensitive device contributing to the aggregated data at each time point within the period of time. Sub-step 120B selecting, from memory, based on the determined state of the sensitive device at each time point, a corresponding stored historical statistical contribution of the sensitive device to the aggregated data at each time point. Then, sub-step 120C subtracting the stored historical statistical contribution selected for a time point from a value of the aggregated data at the corresponding time point, to produce modified aggregated data 120BB.

Following step 220, is step 260 which continues the real-time stage by utilizing the stored historical statistical contribution 215 selected from the time point from the value of the aggregated data at the corresponding time point, which denotes measurement noise. Such that step 260 generates Gaussian noise to equalize variance of the sensitive component.

For example, the client's aggregate data stream can be denoted by $Y_1, Y_2, \ldots, Y_T$, where T is the length of the sequence (in terms of the number of time steps sampled). We let M denote the number of individual components, which are labeled as $\{1,2, \ldots, M\}$. For each $t \in \{1,2, \ldots, T\}$ and $m \in \{1, \ldots, M\}$, we let $X_{m,t}$ denote the value of and $s_{m,t}$ denote the underlying state of component m at time t. The underlying states for each component m belong to a finite set of states denoted by $S_m$. The aggregate data stream at time t is modeled as the sum $$Y_t = N_t + \Sigma_{m=1}^M X_{m,t},$$

where $N_t$ denotes measurement noise. Applying a Gaussian FHMM would assume that the underlying state sequences for each component are mutually independent, that the values of each component $x_{m,t}$ depends on only the state $s_{m,t}$, and that the conditional distribution of $x_{m,t}$ given $s_{m,t}$ is Gaussian with a mean and variance that depends on the state $s_{m,t}$. For each component m and state $s \in S_m$, let $\mu_{m,s}$ denote the mean and $v_{m,s}^2$ denote the variance of $x_{m,t}$ given that $s_{m,t}=s$. Let $$\sigma_{m,*}^2 := \max_{s \in S_m} \sigma_{m,s}^2$$

denote the maximal variance for component m, which calculated by a user. Depending on the specific application, these means and variances could be learned from training data or possibly by consulting device specifications. In particular applications, applying a Gaussian FHMM may only be an approximating assumption, but may still be reasonably accurate and especially appropriate against an adversary also assuming such a model when attempting to undermine privacy.

Optionally, step 265 includes the privacy-mechanism taking as input both the aggregate data stream $(Y_1, Y_2, \ldots, Y_T)$ and the underlying states of the sensitive component $(S_{k,1}, S_{k,2}, \ldots, S_{k,T})$, where we have let k denote the index of the sensitive component. Additionally, step 270 a tradeoff parameter $\lambda \in [0,1]$ can be an input to the privacy-mechanism to select the level of variance equalization. The output of the privacy-mechanism is a modified aggregate data stream, denoted by $(Z_1, Z_2, \ldots, Z_T)$, which is produced according to the equation $$Z_t = Y_t - \mu_{k,S_{k,t}} + \lambda W_t,$$

where $W_t$ is independent, zero-mean Gaussian noise with variance equal to $(\sigma_{k,*}^2 - \sigma_{k,S_{k,t}}^2)$, that is, the difference between the maximal variance of the sensitive component and the variance of the sensitive component given the current state $s_{k,t}$. The subtraction of $\mu_{k,s_{k,t}}$ (i.e., the mean of the sensitive component at time t given that the underlying state is $S_{k,t}$) at each time step has the effect of equalizing the contribution of the sensitive component to the mean of the overall signal to zero, thus reducing the detectability of the sensitive component's underlying states via first-order statistics. This procedure may also improve the ability to detect other non-sensitive components of the aggregate data stream $(Y_1, Y_2, \ldots, Y_T)$, since it subtracts out the minimum mean squared error estimate of the sensitive component values $(x_{k,1}, x_{k,2}, \ldots, x_{k,T})$ made from the states $(S_{k,1}, s_{k,2}, \ldots, S_{k,T})$. For $\lambda$ equal to one, the addition of $W_t$ further equalizes the contribution of the sensitive component to the variance of the overall signal to the maximal variance of the sensitive component, thus completely reducing the detectability of the sensitive component's underlying states from the modified aggregate data stream, if the Gaussian FHMM assumptions are valid for the particular application. However, step 280 allows for the addition of $W_t$ that introduces noise that distorts the aggregate data stream, and hence the parameter $\lambda$ is used to allow the system operator to select a tradeoff parameter 270 between full variance equalization (at $\lambda=1$) for complete undetectability of the sensitive component's underlying states by adding noise 280 and no variance equalization (at $\lambda=0$) for detectability reduced only by mean equalization with no noise added. Wherein, the modified aggregated data with the added noise 280BB may be released to third parties step 290.

In another embodiment of the present disclosure, the privacy-mechanism can be modified to not require the underlying states of the sensitive component as an input. In this case, with only the aggregate data stream $(Y_1, Y_2, \ldots, Y_T)$ as the primary input (along with the tradeoff parameter) to the privacy-mechanism, the underlying states of the sensitive component are first estimated from the aggregate data stream. This estimation could be performed by applying the well-known Viterbi algorithm, or via some other algorithms, possibly be leveraging some application specific domain-knowledge. These estimated states, denoted by $(\hat{S}_{k,1}, \hat{S}_{k,2}, \ldots, \hat{S}_{k,T})$, are then used in place of the actual states $(S_{k,1}, S_{k,2}, \ldots, S_{k,T})$ in the procedure described for the basic embodiment. Thus, for this variant of the invention, the output of the privacy-mechanism is the modified aggregate data stream $(Z_1, Z_2, \ldots, Z_T)$ produced according to the equation $$Z_t = Y_t - \mu_{k,\hat{S}_{k,t}} + W_t,$$

where $W_t$ is independent, zero-mean Gaussian noise with variance equal to $$(\sigma_{k,*}^2 - \sigma_{k,\hat{S}_{k,t}}^2).$$

In another embodiment of the present disclosure, more than one sensitive component can be considered and addressed. Without loss of generality, let the sensitive components be indexed by 1 through k. The procedure in this case is to essentially apply mean and variance equalization for each sensitive component in order to produce the modified aggregate data stream $(Z_1, Z_2, \ldots, Z_T)$ according to the equation $$Z_t = Y_t + \sum_{j=1}^{k} [\lambda_j W_{j,t} - \mu_{j,s_{j,t}}],$$

where each $W_{j,t}$ is independent, zero-mean Gaussian noise with variance equal to $(\sigma_{j,*}^2 - \sigma_{j,s_{j,t}}^2)$, and the tradeoff parameters $\lambda_1, \ldots, \lambda_k \in [0, 1]$ could be identical or distinct. This procedure could be easily parallelized across the sensitive components. Similarly to the previous embodiment, if the sensitive component's underlying states are not directly available as input to the privacy-mechanism, they could be replaced with estimates made from the aggregate data stream.

In other words, the present disclosure can be applied to an aggregate data stream collected over a finite time interval $(1, 2, \ldots, T)$, however, it is readily applied to an indefinite stream of data $(Y_1, Y_2, \ldots)$. Note that each value in the modified aggregate data stream $Z_t$ at time t only depends on one corresponding value aggregate data stream $Y_t$ and the state $s_{k,t}$ at time t, facilitating the application on an indefinite stream.

Figure 3:
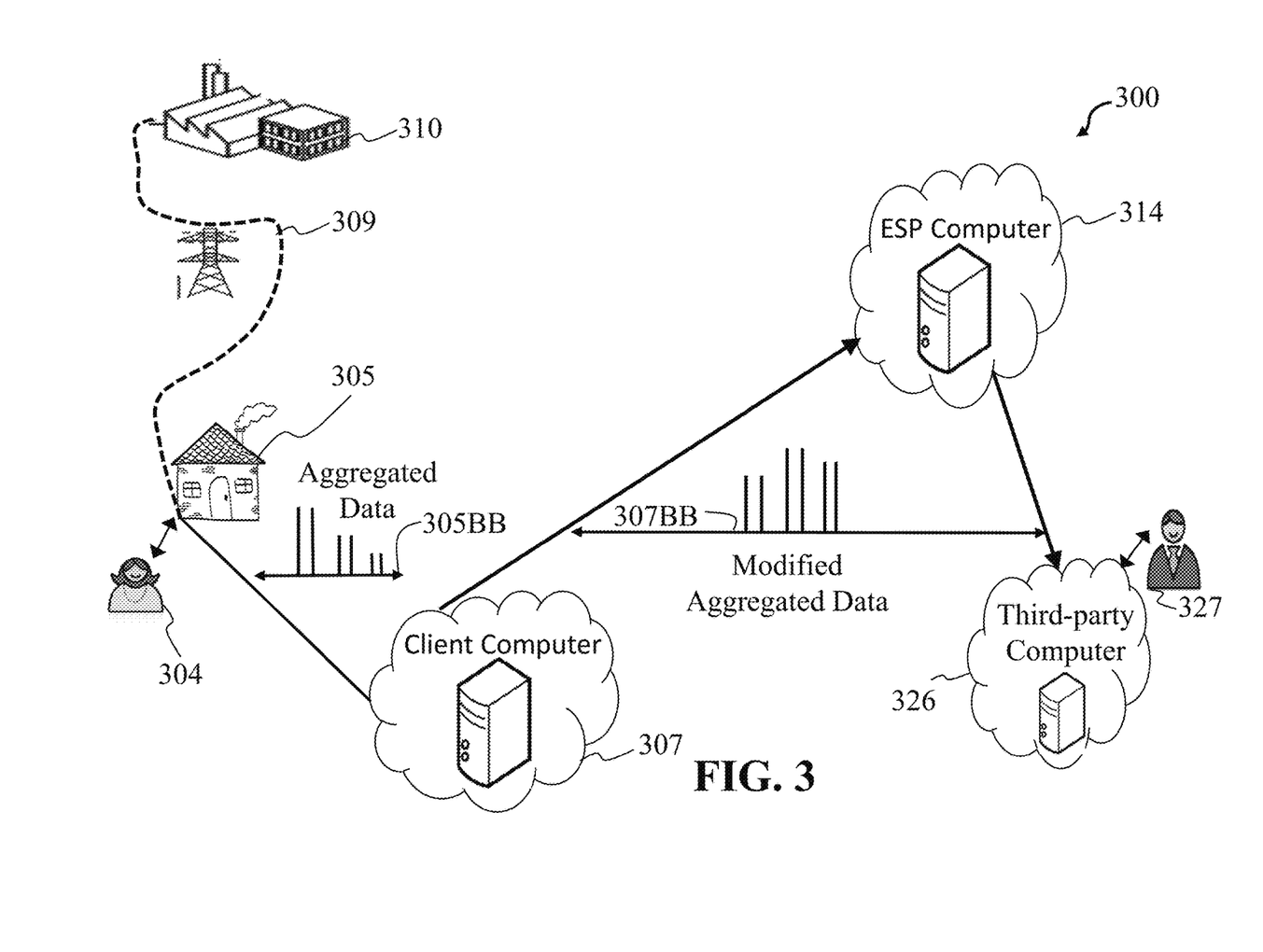
FIG. 3 is a schematic diagram of another method illustrating an alternate application or implementation, according to embodiments of the present disclosure.

FIG. 3 is a schematic diagram of another method for transmitting aggregated data to the third party, similar to FIG. 1A, FIG. 1B and FIG. 1C, according to embodiments of the present disclosure. Wherein the source 310 may be a client 305 having a client computer 307 that is in communication with a ESP computer 314, and in further communication with a third party computer 325 of a third party 327. The client's house 305 collects the client's 304 energy use over a length of time and formulates the client's aggregate data 305BB, which is stored on the client's computer 307. Wherein the aggregate data 305BB is transformed into a modified aggregated data 307BB and sent to the ESP's computer 314, which the ESP's computer 314 sends the modified aggregated data 307BB to the third party computer 325 of the third party 327.

For example, the aggregate data can originate from a user as energy data collected by the user using a user metering device or a user measuring device located on a user side of a third party metering device, such that the user transmits, using a user transmitter, the transformed aggregated data to the third party over a user communication channel, wherein steps of the method are performed by the processor operatively connected with the user transmitter.

Figure 4:
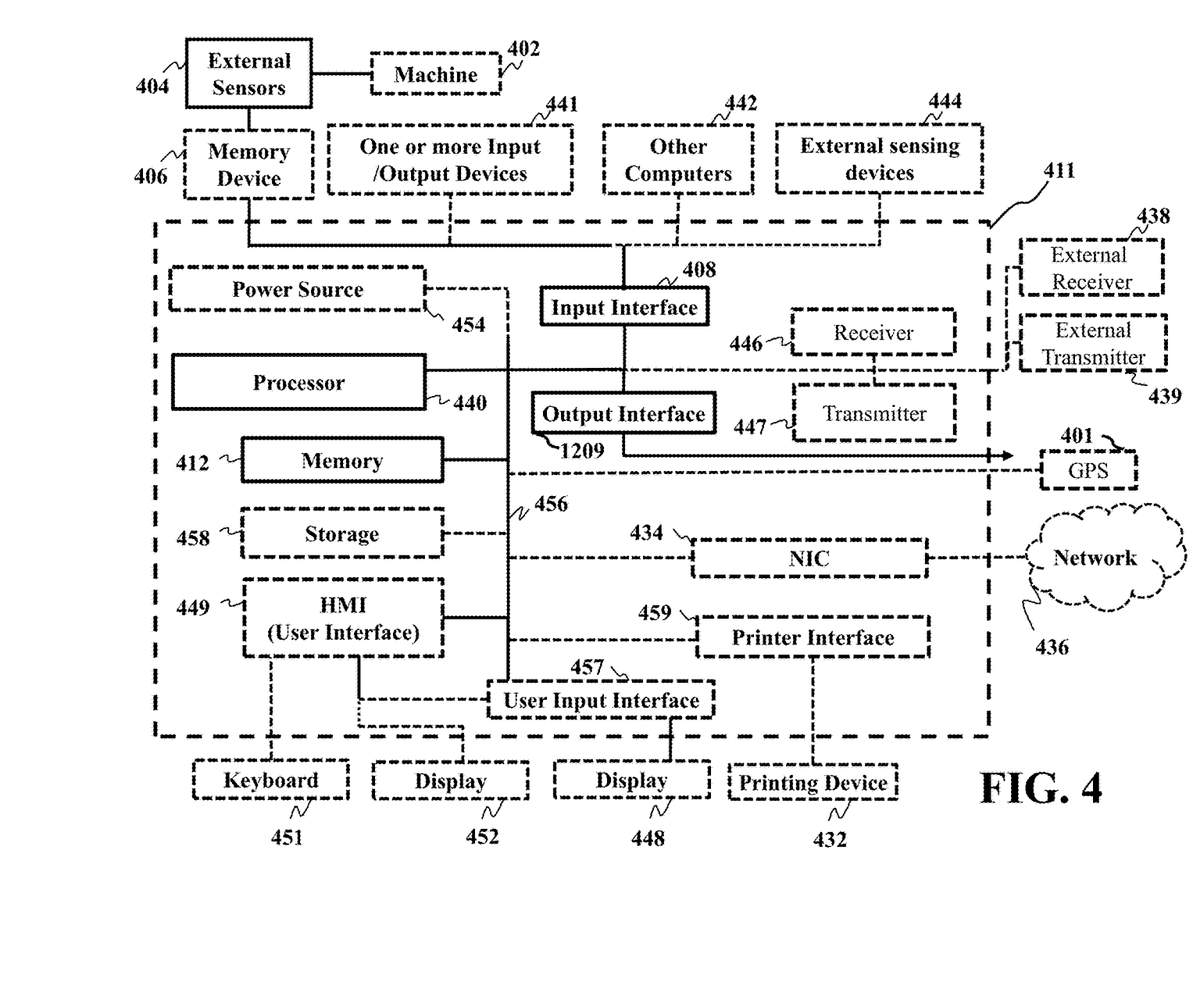
FIG. 4 is a block diagram of illustrating the method of FIG. 1A, that can be implemented using an alternate computer or processor, according to embodiments of the present disclosure.

FIG. 4 is a block diagram of illustrating the method of FIG. 1A, that can be implemented using an alternate computer or processor, according to embodiments of the present disclosure. In particular, the method is configured for modifying the aggregate data to protect a privacy of the aggregated data, while preserving analytical usefulness of the aggregated data. The computer 411 includes a processor 440, computer readable memory 412, storage 458 and user interface 449 with display 452 and keyboard 451, which are connected through bus 456. For example, the user interface 449 in communication with the processor 440 and the computer readable memory 412, acquires and stores the aggregated data in the computer readable memory 412 upon receiving an input from a surface, keyboard surface, of the user interface 457 by a user.

Contemplated is that the memory 412 can store instructions that are executable by the processor, historical data, and any data to that can be utilized by the methods and systems of the present disclosure. The processor 440 can be a single core processor, a multi-core processor, a computing cluster, or any number of other configurations. The processor 440 can be connected through a bus 456 to one or more input and output devices. The memory 412 can include random access memory (RAM), read only memory (ROM), flash memory, or any other suitable memory systems.

Still referring to FIG. 4, a storage device 458 can be adapted to store supplementary data and/or software modules used by the processor. For example, the storage device 458 can store historical device data and other related device data such as manuals for the devices. Additionally, or alternatively, the storage device 458 can store historical data similar to the aggregate data. The storage device 458 can include a hard drive, an optical drive, a thumb-drive, an array of drives, or any combinations thereof.

The system can be linked through the bus 456 optionally to a display interface (not shown) adapted to connect the system to a display device (not shown), wherein the display device can include a computer monitor, camera, television, projector, or mobile device, among others.

The computer 411 can include a power source 454, depending upon the application the power source 454 may be optionally located outside of the computer 411. Linked through bus 456 can be a user input interface 457 adapted to connect to a display device 448, wherein the display device 448 can include a computer monitor, camera, television, projector, or mobile device, among others. A printer interface 459 can also be connected through bus 456 and adapted to connect to a printing device 432, wherein the printing device 432 can include a liquid inkjet printer, solid ink printer, large-scale commercial printer, thermal printer, UV printer, or dye-sublimation printer, among others. A network interface controller (NIC) 434 is adapted to connect through the bus 456 to a network 436, wherein modified aggregate data or other data, among other things, can be rendered on a third party display device, third party imaging device, and/or third party printing device outside of the computer 411.

Still referring to FIG. 4, the aggregated data, modified aggregate data or other data, among other things, can be transmitted over a communication channel of the network 436, and/or stored within the storage system 458 for storage and/or further processing. Further, the aggregated data, modified aggregate data or other data may be received wirelessly or hard wired from a receiver 446 (or external receiver 438) or transmitted via a transmitter 447 (or external transmitter 439) wirelessly or hard wired, the receiver 446 and transmitter 447 are both connected through the bus 456. The computer 411 may be connected via an input interface 408 to external sensing devices 444 and external input/output devices 441. The computer 411 may be connected to other external computers 442. An output interface 409 may be used to output the processed data from the processor 440.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for transmitting aggregated data to a third party, such that a privacy of the aggregated data is protected, while analytical usefulness of the aggregated data is preserved, comprising:
    a transceiver receiving aggregated data generated from multiple sensors that includes time-series data collected over a period of time of sensitive devices and non-sensitive devices, wherein each sensor senses data at a set of time points within the period of time;
    a processor in communication with the transceiver;
    a memory coupled to the processor and storing program instructions executable by the processor to implement, the processor is configured to:
    perform an offline training stage by:
        acquire stored historical statistical contribution data from data generated from sensitive devices of a same device type as the sensitive devices that generated the aggregated data, wherein the stored historical statistical contribution for each sensitive device corresponds to the aggregated data as a function of a state of the sensitive device at each time point within the period of time;
    perform a real-time stage by:
        determine a state of the sensitive device contributing to the aggregated data at each time point within the period of time;
        select, from the memory, based on the determined state of the sensitive device at each time point, a corresponding stored historical statistical contribution of the sensitive device to the aggregated data at each time point, wherein the corresponding stored historical statistical contribution includes a mean and a variance of a contribution of the sensitive device, such that each sensitive device includes a maximal variance determined by a user;
        subtract the stored historical statistical contribution selected for a time point from, and add a scaled noise to, a value of the aggregated data at the corresponding time point, to produce modified aggregated data, which results in preserving the analytical usefulness of the modified aggregated data; and
    a transmitter for transmitting the modified aggregated data to the third party over a communication channel.

2. The system of claim 1, wherein subtracting the stored historical statistical contribution selected for the time point from the value of the aggregated data at the corresponding time point, modifies the aggregated data to produce the modified aggregated data, such that a privacy of the aggregated data is protected, while the analytical usefulness of the modified aggregated data is preserved.

3. The system of claim 1, wherein the subtracting includes:
    subtract the mean from the value of the aggregated data at the time point and adding the scaled noise as a function of a difference between the maximal variance of the sensitive device and the variance of the sensitive device at the time point to produce modified aggregated data.

4. The system of claim 1, further comprising:
    subtract the mean from a value of the aggregated data at the time point to produce modified aggregated data.

5. The system of claim 1, wherein the aggregate data includes usage of at least one energy consumer by the user, such that the at least one energy consumer includes a structure, a part of a structure, an electronic device, an energy or a power consuming device or some combination thereof.

6. A method for transmitting aggregated data to a third party, such that a privacy of the aggregated data is protected, while analytical usefulness of the aggregated data is preserved, comprising:
    receiving, using a transceiver, aggregated data generated from multiple sensors that includes time-series data collected over a period of time of sensitive devices and non-sensitive devices, wherein each sensor senses data at a set of time points within the period of time;
    using a processor in communication with the transceiver and a memory, and storing program instructions executable by the processor to implement;
    performing an offline training stage by:
        acquiring stored historical device data and historical data statistical contribution data from data generated from devices including sensitive devices of a same device type as the sensitive devices that generated the aggregated data, wherein the stored historical statistical contribution for each sensitive device corresponds to the aggregated data as a function of a state of the sensitive device at each time point within the period of time;
    performing a real-time stage by:
        determining a state of the sensitive device contributing to the aggregated data at each time point within the period of time;
        selecting, from the memory, based on the determined state of the sensitive device at each time point, a corresponding stored historical statistical contribution of the sensitive device to the aggregated data at each time point, wherein the corresponding stored historical statistical contribution includes a mean and a variance of a contribution of the sensitive device, such that each sensitive device includes a maximal variance determined by a user;
        subtracting the stored historical statistical contribution selected for a time point from, and add a scaled noise to, a value of the aggregated data at the corresponding time point, to produce modified aggregated data, which results in preserving the analytical usefulness of the modified aggregated data; and
    transmitting using a transmitter the modified aggregated data to a third party over a communication channel.

7. The method of claim 6, further comprising:
    subtracting the mean from a value of the aggregated data at the time point to produce modified aggregated data.

8. The method of claim 6, wherein each sensitive device includes a minimal variance and the maximal variance determined by the user; and
    subtracting the mean from a value of the aggregated data at the time point and adding a scaled noise as a function of a difference between the maximal variance of the sensitive device and the variance of the sensitive device at the time point to produce modified aggregated data.

9. The method of claim 6, wherein the aggregate data originates from the user, and is user energy data collected using a metering device located on a consumer side of the metering device.

10. The method of claim 6, wherein the stored historical device data and historical data statistical contribution data include data obtained from device manuals or device product specifications and data generated from the multiple sensors from the devices prior to processing the aggregate data to obtain the modified aggregate data.

11. The method of claim 6, further comprising:
initiating transmission of the aggregate data to be received by the transceiver by a user input provided on a surface of at least one user input interface and received by the processor.

12. The method of claim 6, further comprising:
using a user input provided on a surface of at least one user input interface and received by the processor, wherein the user input relates to a tradeoff parameter as an input to the real-time stage to select a level of a variance equalization in order to tradeoff between an increased privacy level versus a lower distortion level.

13. A non-transitory computer readable storage medium embodied thereon a program executable by a computer for performing a method, the method for transmitting aggregated data to a third party, such that a privacy of the aggregated data is protected, while analytical usefulness of the aggregated data is preserved, the method comprising:
obtaining, aggregated data generated from multiple sensors that includes time-series data collected over a period of time of sensitive devices and non-sensitive devices, wherein each sensor senses data at a set of time points within the period of time, wherein the aggregate data originates from a user energy data collected by the user using the multiple sensors that include a user metering device or a user measuring device located on a user side of a third party metering device;
using a processor for performing an offline training stage by:
acquiring stored historical statistical contribution data from data generated from sensitive devices of a same device type as the sensitive devices that generated the aggregated data, wherein the stored historical statistical contribution for each sensitive device corresponds to the aggregated data as a function of a state of the sensitive device at each time point within the period of time;
using the processor for performing a real-time stage by:
determining a state of the sensitive device contributing to the aggregated data at each time point within the period of time;
selecting, from the non-transitory computer readable storage medium, based on the determined state of the sensitive device at each time point, a corresponding stored historical statistical contribution of the sensitive device to the aggregated data at each time point, wherein the corresponding stored historical statistical contribution includes a mean and a variance of a contribution of the sensitive device, such that each sensitive device includes a maximal variance determined by a user;
subtracting the stored historical statistical contribution selected for a time point from, and add a scaled noise to, a value of the aggregated data at the corresponding time point, to produce modified aggregated data, which results in preserving the analytical usefulness of the modified aggregated data; and
transmitting by the user using a user transmitter the modified aggregated data to a third party over a user communication channel.

14. The method of claim 13, wherein the subtracting includes:
subtracting the mean from the value of the aggregated data at the time point and adding the scaled noise as a function of a difference between the maximal variance of the sensitive device and the variance of the sensitive device at the time point to produce modified aggregated data.

15. The method of claim 13, further comprising:
subtracting the mean from a value of the aggregated data at the time point to produce modified aggregated data.

16. The method of claim 13, wherein further comprising:
using a user input provided on a surface of at least one user input interface and received by the processor, wherein the user input relates to a tradeoff parameter as an input to the real-time stage to select a level of a variance equalization in order to tradeoff between an increased privacy level versus a lower distortion level.

17. The method of claim 13, wherein subtracting the stored historical statistical contribution selected for the time point from the value of the aggregated data at the corresponding time point, modifies the aggregated data to produce the modified aggregated data, such that a privacy of the aggregated data is protected, while the analytical usefulness of the modified aggregated data is preserved.

18. A system for transmitting aggregated data to a third party, such that a privacy of the aggregated data is protected, while analytical usefulness of the aggregated data is preserved, comprising:
a transceiver receiving aggregated data generated from multiple sensors that includes time-series data collected over a period of time of sensitive devices and non-sensitive devices, wherein each sensor senses data at a set of time points within the period of time;
a processor in communication with the transceiver;
a memory coupled to the processor and storing program instructions executable by the processor to implement, the processor is configured to:
perform an offline training stage by:
acquire stored historical statistical contribution data from data generated from sensitive devices of a same device type as the sensitive devices that generated the aggregated data, wherein the stored historical statistical contribution for each sensitive device corresponds to the aggregated data as a function of a state of the sensitive device at each time point within the period of time;
perform a real-time stage by:
determine a state of the sensitive device contributing to the aggregated data at each time point within the period of time;
select, from the memory, based on the determined state of the sensitive device at each time point, a corresponding stored historical statistical contribution of the sensitive device to the aggregated data at each time point, such that the corresponding stored historical statistical contribution includes a mean and a variance of a contribution of the sensitive device to the aggregated data at each time point, and that each sensitive device includes a minimal variance and a maximal variance determined by a user;

subtract the mean from a value of the aggregated data at the corresponding time point and adding a scaled noise as a function of a difference between the maximal variance of the sensitive device and the variance of the sensitive device at the time point, to produce modified aggregated data, which results in preserving the analytical usefulness of the modified aggregated data; and a transmitter for transmitting the modified aggregated data to the third party over a communication channel.

19. A system for transmitting aggregated data to a third party, such that a privacy of the aggregated data is protected, while analytical usefulness of the aggregated data is preserved, and that the aggregated data assists controlling an operation of at least one energy consuming device based upon preventative maintenance of the at least one energy consuming device, comprising:

a transceiver receiving aggregated data generated from multiple sensors that includes time-series data collected over a period of time of sensitive devices and non-sensitive devices, wherein each sensor senses data at a set of time points within the period of time;

a processor in communication with the transceiver;

a memory coupled to the processor and storing program instructions executable by the processor to implement, the processor is configured to:

perform an offline training stage by:
acquire stored historical statistical contribution data from data generated from sensitive devices of a same device type as the sensitive devices that generated the aggregated data, wherein the stored historical statistical contribution for each sensitive device corresponds to the aggregated data as a function of a state of the sensitive device at each time point within the period of time;

perform a real-time stage by:
determine a state of the sensitive device contributing to the aggregated data at each time point within the period of time;

select, from the memory, based on the determined state of the sensitive device at each time point, a corresponding stored historical statistical contribution of the sensitive device to the aggregated data at each time point, wherein the corresponding stored historical statistical contribution includes a mean and a variance of a contribution of the sensitive device, such that each sensitive device includes a maximal variance determined by a user;

subtract the mean from a value of the aggregated data at the corresponding time point and adding a scaled noise as a function of a difference between the maximal variance of the sensitive device and the variance of the sensitive device at the time point, to produce modified aggregated data, which results in preserving the analytical usefulness of the modified aggregated data; and a transmitter for transmitting the modified aggregated data to the third party over a communication channel, wherein the third party assists in controlling the operation of the at least one energy consuming device per the preventative maintenance of the at least one energy consuming device, based on the modified aggregated data.

\* \* \* \* \*